Patented Dec. 25, 1951

2,580,308

UNITED STATES PATENT OFFICE 2,580,308

WOOD-SWELLING COMPOSITION AND A JOINT PRODUCED THEREWITH

Walter Lindenthal, Freeport, N. Y.

No Drawing. Application October 24, 1946,
Serial No. 705,497

3 Claims. (Cl. 154—43)

My invention relates to novel compositions of matter, and to their use in connection with articles of manufacture containing wooden members which it is desired to attach firmly to other members, whether they be wooden or non-wooden.

I am aware that there are numerous glues and adhesives known for joining wooden members with other wooden members, or with non-wooden members. Such glues and adhesives depend for their efficacy mainly upon the formation of a film or coating of the glue or adhesive between the members to be joined, each member adhering to the intervening film or coating.

Binders such as the prior art ones, as is well-known, performed many tasks in a most satisfactory manner. However, in many cases joints held together by such binders ruptured under normal conditions of use especially under conditions of low humidity. That such is the case is the all-too-common experience of practically everyone.

My present invention is directed to providing novel compositions of matter which substantially improve the strength of joints of the type under consideration. My novel compositions, moreover, are easy to apply and are economical to use.

I attain the desired results with compositions which depend for their effectiveness mainly on a quite different principle from that upon which prior art adhesives operate. Instead of relying upon an intervening film or coating as the bonding means, I have found that my novel compositions enable me to attain the desired result by causing the treated wooden fibres to swell, thereby resulting in a locking engagement with a joinable member when the latter is engaged with the treated wooden member. In other words, my novel compositions may be said to result substantially in a joint which unites the members to be joined directly to each other, rather than indirectly, through an intervening adherent coating.

My compositions appear to be unique, moreover, in that they may be applied repeatedly to the same joint to redissolve the previously-applied material, causing further swelling. Also, my compositions instead of drying to a hard state retain considerable flexibility over a long period of time. Furthermore, in joints such as those involving chair rungs, especially strong bonding is effected if the hole has a small reservoir of my composition to effect maximum swelling at the bottom of the hole where such swelling is very effective. Such a reservoir is more easily obtained by providing the hole with a V bottom, or by cutting off the rung at an angle, or by cutting channels in the rung.

It will be understood that my invention contemplates the use of my novel compositions in joining joinable members. By "joinable members" is meant at least two members which fit together to make a unitary structure. Examples of such members would be a chair rung and chair leg having a hole in which the rung fits snugly; a wooden hammer handle and the metal hammer head to be used therewith; floor brush and handle therefor; and mop and handle therefor. Other examples of "joinable members" as the term is used herein will be obvious in view of the foregoing definition and examples, it is believed.

While my novel compositions differ in their mode of operation from those of the prior art, it is not to be thought that my compositions possess no properties enabling them to effect a bond via the medium of an intervening coating or film. On the contrary, in actual practice it is usually the case that some of the strength of the bond is attributable to such a coating or film. Nevertheless, the chief bonding action of my compositions occurs as the result of the swelling action previously described, and the consequent direct bond thereby obtained.

The compositions with which joinable members, at least one of which is wooden, are held firmly in place comprise certain essential ingredients. These are (1) a natural resin of acidic nature; (2) an oxygenated solvent of low molecular weight; (3) water; and (4) an alkaline substance capable of reacting with the acidic resin to form a water-dispersible composition. In addition to these four ingredients, it has been found that certain proteinaceous materials impart especially advantageous properties to the compositions. These materials are the so-called prolamines contained in cereal grains.

Among the natural, acidic resins which may be employed in my novel compositions are noted: rosin, shellac, copal and sandarac. Oxygenated solvents found to give satisfactory results include ethyl alcohol (as such or in various denatured forms), isopropyl alcohol, acetone and ethyl acetate. Oxygenated solvents which have viscosities substantially of the order of the ones mentioned may be used herein. The basic substances found to be satisfactory include triethanolamine, morpholine, aminohydroxy compounds such as 2-amino-2-methyl propanol, ammonia, potassium hydroxide, sodium hydroxide and alkaline salts such as sodium carbonate.

As examples of prolamines which may be used are noted: zein (from corn), gladin (from wheat), and hordein (from rye).

Variations of the concentrations of the essential ingredients, including the prolamines, are possible, within certain limitations. I have found it advantageous to employ concentrations within the following ranges, the parts all being by weight:

(a) 4 to 12 parts of the natural resin,
(b) 4 to 12 parts of the oxygenated solvent,
(c) 2 to 8 parts of the basic substance,
(d) 16 to 36 parts of water, and
(e) 0 to 8 parts of a prolamine.

Especially desirable results have been obtained with a composition comprising 8 parts of (a) above, 8 parts of (b), 4 parts of (c), 24 parts of water, and 3.5 parts of (e).

Compositions containing concentrations not substantially conforming to the above-indicated ranges do not yield the desired results.

It has been found that the strongest and most permanent joints were obtained in cases where the amount of basic substance was only slightly in excess of the minimum required to hold the resin and prolamine in solution. While I do not wish to be restricted to any particular theory, I am led to believe that the desired action of my composition is obtained by a penetration through only a short distance (say, less than .025") into the surface of the wood treated, followed by a change to an insoluble and essentially impervious state within this comparatively thin layer.

Compositions which contained larger amounts of triethanolamine or other basic substance were found to penetrate too far, and failed to produce the desired swelling effect. Such compositions acted very quickly when tested so that the wooden joint at first tightened within 2 or 3 minutes; however, after about 24 hours the swelling had subsided and the joint was unsatisfactory in strength. Apparently, the composition had penetrated too deeply.

Similar effects were noted when substantial amounts of diethylene glycol or other hygroscopic compounds of similar structure were included in the composition.

Compositions in which the amount of basic substance was so adjusted as to leave the resin in an easily precipitatable state by an acidic condition were found to be most effective.

It seems that acids in the wooden joint treated provide the condition which renders the resin insoluble. This renders the wood substantially impervious to further penetration except in the outer layer. Thus my composition exerts its effect near the surface of application thus producing maximum swelling.

Wood contains a substantial percentage of voids, since its apparent specific gravity in the natural state is less than 1. Yet the absolute specific gravity of the wood is known to be about 1.40. Hence any liquid which would penetrate too far would merely fill up the voids inside the wood without producing the desired action of swelling.

In preparing my novel compositions, the prolamine and resin are dissolved in the solvent and the basic substance is added to the resulting solution. The reaction between the acidic resin and basic substance usually causes a slight warming. Water is then added. In cases where the prolamine is omitted the above procedure is followed, except for the omission of the prolamine.

This method of preparation has proved favorable from a standpoint of speed and convenience. However, the order of mixing does not appear critical since the liquids may all be mixed, and the solids added while agitating the liquid mixture. Compositions made in this manner dissolve more slowly, but the final composition has been found equally as effective as that prepared in manner first described.

My compositions are clear, brownish colored liquids, resembling varnish in color and consistency. They may be applied with a brush or other suitable medium for spreading liquids on to solid surfaces.

In using my novel compositions to hold in place joinable members, at least one of which is wooden, some of the composition is placed on that part of the wooden member which is to come in contact with another member. While good results have been obtained by immediate joining of the members, sufficient time is preferably allowed for the composition to soak into the wood with which it is in contact. It has been found that this time varies from 5 to 25 minutes, 15 minutes being found satisfactory for most purposes. After the passage of sufficient time, as indicated, the members to be joined are brought together and locked into place. If desired, the treatment may be repeated a plurality of times, allowing at least about 10 to 15 minutes between each application.

An additional application may be made just before the members are joined. The generous use of my composition is recommended. Joints of a ⅜" maple dowel in a hole in a maple block in which a glossy coating has dried over the end grain of the dowel have shown the best strength.

In order more fully to explain my invention I am setting forth the following examples, which are intended only for purposes of illustration and not for purposes of limitation. All parts are by weight.

*Example I*

8 parts of rosin were dissolved in the same amount of ethyl alcohol. To the resulting solution was added a solution of 4 parts of triethanolamine in 24 parts of water.

The resulting solution was varnish-like in appearance. It was applied liberally to the exposed end of a chair rung and this was allowed to stand for 10 minutes. A second coat of the solution was applied and after setting for 10 minutes, the rung was set in its socket. A strong bond was obtained. Similarly, loose mop handles were tightened.

The solution was also used in tightening loose hammer and axe handles, without removing the handles. In cases where the handles were very loose, several coats of the composition were required.

*Example II*

Example I was followed, using, in addition to the ingredients therein named, 3.5 parts of zein. This was dissolved along with the rosin in alcohol which was increased to 13.3 parts, the triethanolamine was then added, and finally the water.

Similar results to those obtained in the previous example were obtained. Indeed, in cases where the article treated is exposed to low humidity over long periods of time, the composition of Example II gives superior results to those obtained with the composition of Example I.

*Example III*

A dispersion containing 6 parts of rosin, 8 parts of alcohol, 1 part of triethanolamine, 1 part of ammonia, 6 parts of zein and 24 parts of water was prepared.

Satisfactory results with this composition were obtained when it was tested in accordance with Example I.

Example IV

A dispersion containing 10 parts of rosin, 10 parts of alcohol, 2 parts of triethanolamine, 1 part of ammonia, 4 parts of zein and 26 parts of water was prepared.

Satisfactory results with this composition were obtained when it was tested in accordance with Example I.

Example V

A dispersion containing 3.6 parts of rosin, 8.8 parts of alcohol, 0.25 parts of ammonia, 24 parts of water, 3.6 parts of shellac (wax free), 1.5 parts of morpholine and 2.0 parts of sulphonated castor oil.

Satisfactory results with this composition were obtained when it was tested in accordance with Example I.

The term "dispersion" as used in the specification and claims hereof is intended to designate a condition where the dispersed ingredients are in a dissolved or collodial state such that no precipitation occurs even when the composition is allowed to stand for long periods of time.

While the invention has been described in detail, it is understood that modifications therein are possible without departing from the spirit and scope of the invention. Accordingly, the invention is not to be limited except as required by the appended claims, and construed as broadly as permissible in view of the prior art.

I claim:

1. The combination which comprises at least two joinable members at least one of which is wood, said joinable members consisting of a recessed member and a second member adapted to fit within the recess of said recessed member, at least one of said members being impregnated with a composition consisting essentially of 4 to 12 parts of a natural resin of acidic nature, 4 to 12 parts of an oxygenated solvent of low molecular weight, water, and 2 to 8 parts of a basic substance which will react with the acidic resin to form a water dispersible composition, said composition being adapted to cause swelling of the wood with which it is in contact.

2. The combination which comprises at least two joinable members at least one of which is wood, said joinable members consisting of a recessed member and a second member adapted to fit within the recess of said recessed member, at least one of said members being impregnated with a composition consisting essentially of 4 to 12 parts of a natural resin of acidic nature, 4 to 12 parts of an oxygenated solvent of low molecular weight, 0 to 8 parts of a prolamine, 16 to 36 parts of water, and 2 to 8 parts of a member selected from the group consisting of triethanolamine, 2-amino-2-methyl propyl alcohol, ammonia, potassium hydroxide, sodium hydroxide, morpholine, and sodium carbonate, said composition being adapted to cause swelling of the wood with which it is in contact.

3. The combination which comprises at least two joinable members at least one of which is wood, said joinable members consisting of a recessed member and a second member adapted to fit within the recess of said recessed member, at least one of said members being impregnated with a composition consisting essentially of 8 parts of rosin, 8 parts of ethyl alcohol, 4 parts of triethanolamine, 24 parts of water, and 3.5 parts of zein, said composition being adapted to cause swelling of the wood with which it is in contact.

WALTER LINDENTHAL.

REFERENCES CITED

The following references are of record in the file of this patent:

UNITED STATES PATENTS

| Number | Name | Date |
|---|---|---|
| 2,028,287 | Leicester | Jan. 21, 1936 |
| 2,040,126 | Grieve | May 12, 1936 |
| 2,277,891 | Sturken | Mar. 31, 1942 |
| 2,284,800 | Close | June 2, 1942 |
| 2,389,371 | Kroeger et al. | Nov. 20, 1945 |
| 2,413,229 | Hodshon et al. | Dec. 24, 1946 |

FOREIGN PATENTS

| Number | Country | Date |
|---|---|---|
| 476,581 | Great Britain | Dec. 10, 1937 |
| 540,310 | Great Britain | Oct. 13, 1941 |